United States Patent
Fukamachi et al.

(10) Patent No.: US 9,277,339 B2
(45) Date of Patent: Mar. 1, 2016

(54) SOUND SOURCE DETECTION APPARATUS (75) Inventors: Hideo Fukamachi, Hadano (JP); Toshiki Kindo, Yokohama (JP)

(73) Assignee: TOYOTA JIDOSHA KABUSHIKI KAISHA, Toyota-Shi (JP)

(*) Notice: Subject to any disclaimer, the term of this patent is extended or adjusted under 35 U.S.C. 154(b) by 102 days.

(21) Appl. No.: 14/360,564

(22) PCT Filed: Nov. 24, 2011

(86) PCT No.: PCT/JP2011/077066
§ 371 (c)(1),
(2), (4) Date: Jun. 19, 2014

(87) PCT Pub. No.: WO2013/076843
PCT Pub. Date: May 30, 2013

(65) Prior Publication Data
US 2014/0369509 A1  Dec. 18, 2014

(51) Int. Cl.
*H04R 29/00* (2006.01)
*H04R 3/00* (2006.01)
*G06F 17/11* (2006.01)
*G01S 13/93* (2006.01)
*G01S 3/808* (2006.01)

(52) U.S. Cl.
CPC .............. *H04R 29/00* (2013.01); *G01S 3/8083* (2013.01); *G01S 13/93* (2013.01)

(58) Field of Classification Search
None
See application file for complete search history.

(56) References Cited

U.S. PATENT DOCUMENTS

| 2009/0285409 A1 | 11/2009 | Yoshizawa et al. | |
| 2010/0228482 A1 | 9/2010 | Yonak | |
| 2010/0303254 A1 | 12/2010 | Yoshizawa et al. | |
| 2014/0204714 A1* | 7/2014 | Sato | G01S 3/808 367/117 |
| 2014/0241126 A1* | 8/2014 | Funayama | G01S 3/808 367/129 |

FOREIGN PATENT DOCUMENTS

| CN | 101512374 A | 8/2009 |
| GB | 1430051 A | 3/1976 |
| JP | 46035435 B | 10/1971 |
| JP | 49097651 A | 9/1974 |
| JP | 60151522 A | 8/1985 |
| JP | 05092767 U | 12/1993 |
| JP | 06175676 A | 6/1994 |
| JP | 08202999 A | 8/1996 |
| JP | 2010204104 A | 9/2010 |
| WO | 2009044509 A1 | 4/2009 |

* cited by examiner

*Primary Examiner* — Andrew L Sniezek
(74) *Attorney, Agent, or Firm* — Kenyon & Kenyon LLP (57) ABSTRACT

In a sound source detection apparatus that detects a sound source of a detection subject on the basis of collected sounds, sounds are collected by at least one sound collector, an autocorrelation between sounds collected in time series by the sound collector is calculated, and a determination as to whether or not the sound source of the detection subject exists is made on the basis of the autocorrelation. More particularly, sounds are preferably collected respectively by two or more sound collectors such that the existence of the sound source of the detection subject is determined by determining whether or not the autocorrelations of the sounds collected by the two or more sound collectors satisfy a predetermined condition. By using the autocorrelation to detect the sound source of the detection subject in this manner, high robustness against an S/N ratio is exhibited, leading to an improved detection performance when detecting the sound source of the detection subject.

1 Claim, 11 Drawing Sheets

SOUND SOURCE DETECTION APPARATUS

CROSS-REFERENCE TO RELATED APPLICATIONS

This is a national phase application based on the PCT International Patent Application No. PCT/JP2011/077066 filed on Nov. 24, 2011, the entire contents of which is incorporated herein by reference.

TECHNICAL FIELD

The invention relates to a sound source detection apparatus that detects a sound source of a detection subject on the basis of collected sounds.

BACKGROUND ART

In a typical sound source detection apparatus, peripheral sounds are collected respectively by a plurality of sound collectors, and the existence, direction, and so on of a sound source (travel sound from a vehicle, for example) is detected using a cross-correlation between the sounds collected by the plurality of sound collectors. In an apparatus described in Patent Document 1, acoustic signals output respectively by a plurality of microphones disposed at predetermined intervals are converted into corrected acoustic signals by removing frequency components in a low frequency band and a high frequency band respectively therefrom using a band pass filter, whereupon a power of a predetermined frequency band in which features of vehicle travel sound appear is calculated from the corrected acoustic signals. When the power level is higher than a predetermined value, it is determined that an approaching vehicle exists. Further, the corrected acoustic signals are converted into noise-reduced signals by removing an unnecessary noise component therefrom, whereupon a cross-correlation between the noise-reduced signals from the plurality of microphones is calculated. An approach direction of the approaching vehicle is then identified from an arrival time difference occurring when the cross-correlation takes a maximum value.

Patent Document 1: Japanese Utility Model Application Publication No. 5-92767
Patent Document 2: Japanese Patent Application Publication No. 8-202999
Patent Document 3: Japanese Patent Application Publication No. 60-151522

SUMMARY OF THE INVENTION

When the travel sound of a vehicle approaching a host vehicle is detected, the approaching vehicle approaches the host vehicle from a removed position, and therefore the travel sound decreases in volume in accordance with the distance by which the approaching vehicle is removed from the host vehicle. Hence, when sound source detection is performed using a cross-correlation, robustness against a signal-to-noise (S/N) ratio decreases as the travel sound of the approaching vehicle decreases, making it difficult to detect the travel sound from peripheral ambient noise (electromagnetic noise and the like). The approaching vehicle can therefore only be determined when nearby (when the travel sound increases), and as a result, an approaching vehicle detection timing is delayed.

An object of the invention is therefore to provide a sound source detection apparatus that exhibits an improved detection performance when detecting a sound source of a detection subject.

A sound source detection apparatus according to the invention detects a sound source of a detection subject on the basis of collected sounds, and includes: at least one sound collector; autocorrelation calculating means for calculating an autocorrelation between sounds collected in time series by the sound collector; and determining means for determining whether or not the sound source of the detection subject exists on the basis of the autocorrelation calculated by the autocorrelation calculating means.

The sound source detection apparatus includes at least one sound collector, and peripheral sounds are collected by the sound collector. In the sound source detection apparatus, an autocorrelation is calculated by the autocorrelation calculating means using time series data of the sounds. Furthermore, in the sound source detection apparatus, the determination as to whether or not the sound source of the detection subject exists is made by the determining means on the basis of the autocorrelation. In the case of ambient noise collected by the sound collector at all times, a correlation cannot be obtained following a time shift, and therefore the autocorrelation is low. In the case of a sound emitted from a specific sound source, however, a correlation can be obtained following a time shift, and therefore the autocorrelation increases. When an autocorrelation is used, therefore, the robustness of the autocorrelation against the S/N ratio increases even when the sound from the specific sound source is comparatively small. In particular, the robustness of an autocorrelation against the S/N ratio is higher than that of a cross-correlation calculated from sounds collected respectively by a plurality of sound collectors. Hence, in the sound source detection apparatus, by calculating the autocorrelations of the collected sounds and using the autocorrelations to detect the sound source of the detection subject, high robustness against the S/N ratio is exhibited, leading to an improved detection performance when detecting the sound source of the detection subject. In particular, when the sound from the sound source increases gradually (for example, when an approaching vehicle approaches gradually such that the travel sound gradually increases in volume), the sound source can be detected at an earlier timing than with a conventional method using a cross-correlation.

Preferably, in the sound source detection apparatus according to the invention, two or more sound collectors are provided, the autocorrelation calculating means calculates respective autocorrelations for each of the sound collectors, and the determining means determines whether or not the autocorrelations, calculated by the autocorrelation calculating means, of the sounds collected respectively by the two or more sound collectors satisfy a predetermined condition.

This sound source detection apparatus includes at least two sound collectors, and sounds are collected respectively by the sound collectors. In the sound source detection apparatus, autocorrelations are calculated respectively by the autocorrelation calculating means using the time series data of the sounds collected by the respective sound collectors. Furthermore, in the sound source detection apparatus, the determination as to whether or not the sound source of the detection subject exists is made by the determining means on the basis of whether or not the autocorrelations of the respective sound collectors satisfy a predetermined condition. Hence, in the sound source detection apparatus, by calculating the autocorrelations between the sounds collected respectively by the two or more sound collectors and using the autocorrelations of the two or more sound collectors to detect the sound source of the detection subject, high robustness against the S/N ratio is exhibited, leading to a further improved detection performance when detecting the sound source of the detection subject. For example, in a case where the autocorrelations between the sounds collected respectively by the two or more sound collectors are used, noise (ambient noise) can be determined when the autocorrelation of one sound collector increases but the autocorrelation of the other sound collector remains low, and therefore an improvement in detection precision is achieved in comparison with a case where the autocorrelation of a sound collected by a single sound collector is used. Moreover, the condition for determining sound source detection can be set lower than that of a case where the autocorrelation of a sound collected by a single sound collector is used (since the sound source can be determined even when the sound from the sound source is small), and therefore the sound source can be detected at an earlier timing.

The sound source detection apparatus according to the invention preferably further includes: cross-correlation calculating means for calculating a cross-correlation between the sounds collected in time series respectively by the two or more sound collectors; and specifying means for specifying a position of the sound source of the detection subject on the basis of the cross-correlation calculated by the cross-correlation calculating means.

In this sound source detection apparatus, sounds are collected respectively by the two or more sound collectors. In the sound source detection apparatus, a cross-correlation is calculated by the cross-correlation calculating means using time series data of the sounds collected by the respective sound collectors. Furthermore, in the sound source detection apparatus, the position of the sound source of the detection subject is specified by the specifying means on the basis of the cross-correlation. When a cross-correlation is used, a time difference at which the sound from the sound source reaches the respective sound collectors is learned, and therefore the position of the sound source (a direction of the sound source and a distance to the sound source, for example) can be specified from an arrival time difference. Hence, in the sound source detection apparatus, by further calculating the cross-correlation between the sounds collected respectively by the two or more sound collectors and using the cross-correlation to detect the sound source of the detection subject, the position of the sound source of the detection subject can also be detected. Further, by using both the autocorrelation and the cross-correlation in the sound source detection apparatus, a situation in which an erroneous detection is obtained from the cross-correlation on the basis of the determination result obtained from the autocorrelation can be prevented.

The sound source detection apparatus according to the invention preferably further includes breakdown determining means for determining a breakdown in a sound collector by comparing variation in the autocorrelations, calculated by the autocorrelation calculating means, of the sounds collected respectively by the two or more sound collectors.

Typically, when a sound collector breaks down, the sound collector can output only sounds of an identical level, and therefore the autocorrelation thereof takes an irregular value (an extremely small value or an extremely large value, for example). Further, when the sound collector breaks down, sounds may be output randomly such that the autocorrelation takes a random value. In this case, when compared with an autocorrelation of a sound collected by a normal sound collector, a clear difference emerges between variation in the autocorrelation of the broken sound collector and variation in the autocorrelation of the normal sound collector. Hence, in the sound source detection apparatus, a breakdown in a sound collector is determined by the breakdown determining means by comparing variation in the autocorrelations between the sounds collected respectively by the two or more sound collectors. In the sound source detection apparatus, by employing the autocorrelations of the two or more sound collectors in this manner, a breakdown in a sound collector can also be determined. As a result, an erroneous detection caused by a breakdown in a sound collector can be prevented.

According to the invention, an autocorrelation of collected sounds is calculated and used to detect a sound source of a detection subject. As a result, robustness against the S/N ratio increases, leading to an improved detection performance when detecting the sound source of the detection subject.

MODES FOR CARRYING OUT THE INVENTION

Embodiments of a sound source detection apparatus according to the invention will be described below with reference to the drawings. Note that identical or corresponding elements in the drawings have been allocated identical reference symbols, and duplicate description thereof has been omitted.

In these embodiments, the sound source detection apparatus according to the invention is applied to an approaching vehicle detection apparatus installed in a vehicle. The approaching vehicle detection apparatus according to the embodiments detects another vehicle approaching a host vehicle on the basis of sounds collected by a microphone (in other words, detects travel sound (a sound source) emitted from the other vehicle), and provides a driving assistance apparatus with information relating to the approaching vehicle. The embodiments include three embodiments. In a first embodiment, two microphones are provided and both an autocorrelation and a cross-correlation are used. In a second embodiment, a breakdown determination is performed in addition to the configuration of the first embodiment. In a third embodiment, a single microphone is provided and only an autocorrelation is used.

Note that the travel sound of the vehicle is mainly constituted by road noise (frictional noise generated between a tire surface and a road surface) and pattern noise (an air vortex (compression/release) in a tire groove). The travel sound may also include engine noise, wind noise, and so on. A frequency component range of the travel sound of the vehicle may be measured in advance by experiment or the like.

Figure 1:
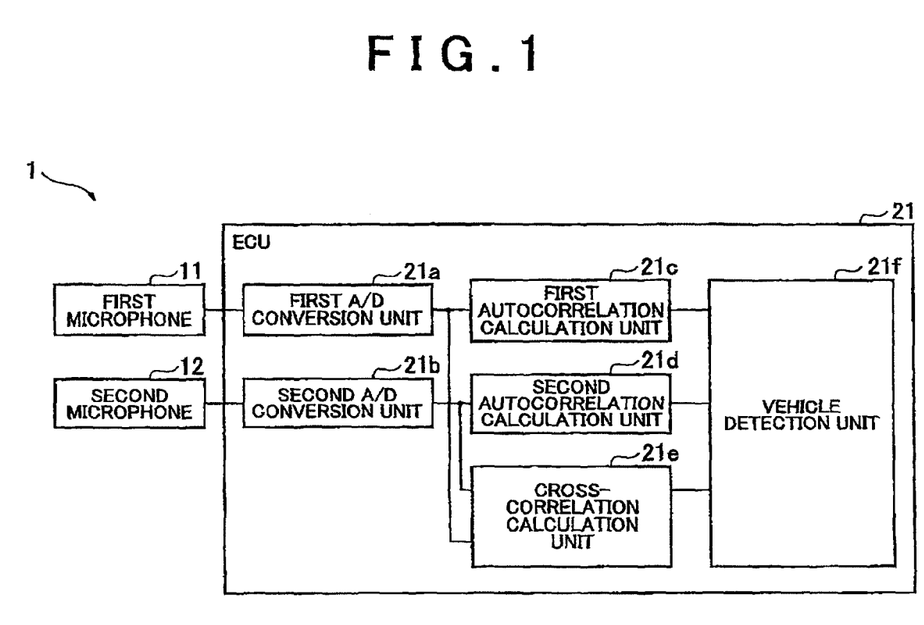
FIG. 1 is a view showing a configuration of an approaching vehicle detection apparatus according to a first embodiment.
Figure 2:
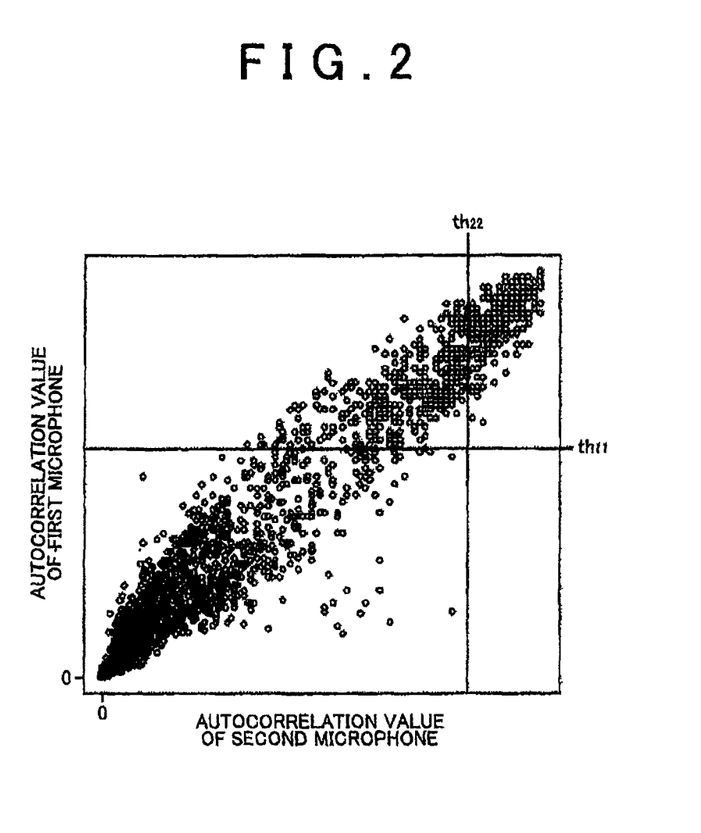
FIG. 2 is a view showing an example of a method of determining the existence of an approaching vehicle on a scatter diagram of autocorrelation values of audio signals from two microphones.
Figure 3:
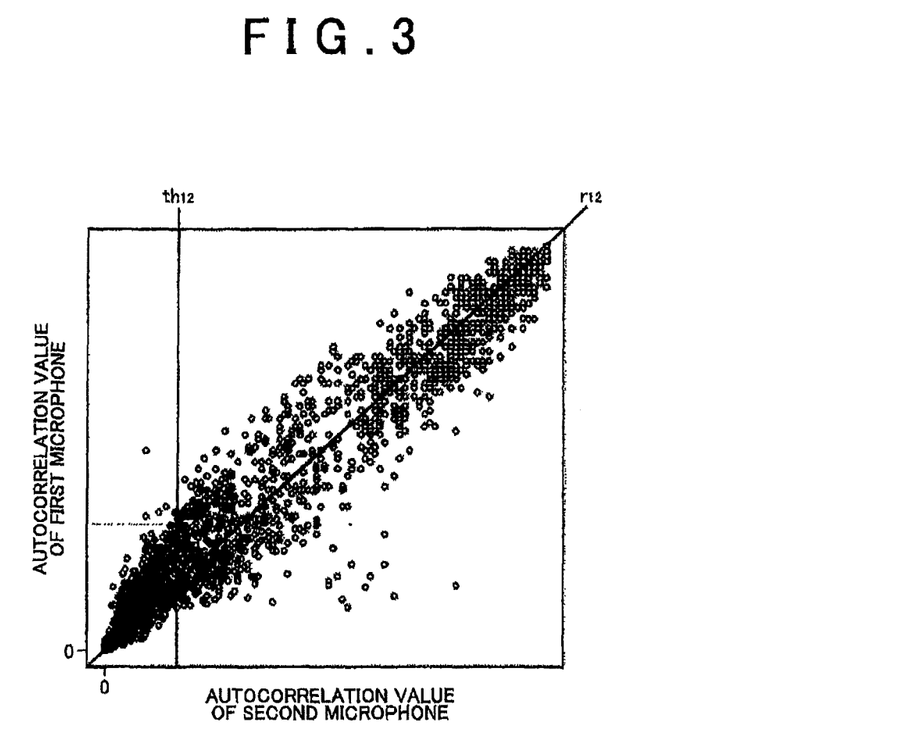
FIG. 3 is a view showing an example of a method of determining the existence of an approaching vehicle on a scatter diagram of autocorrelation values of audio signals from two microphones.
Figure 4:
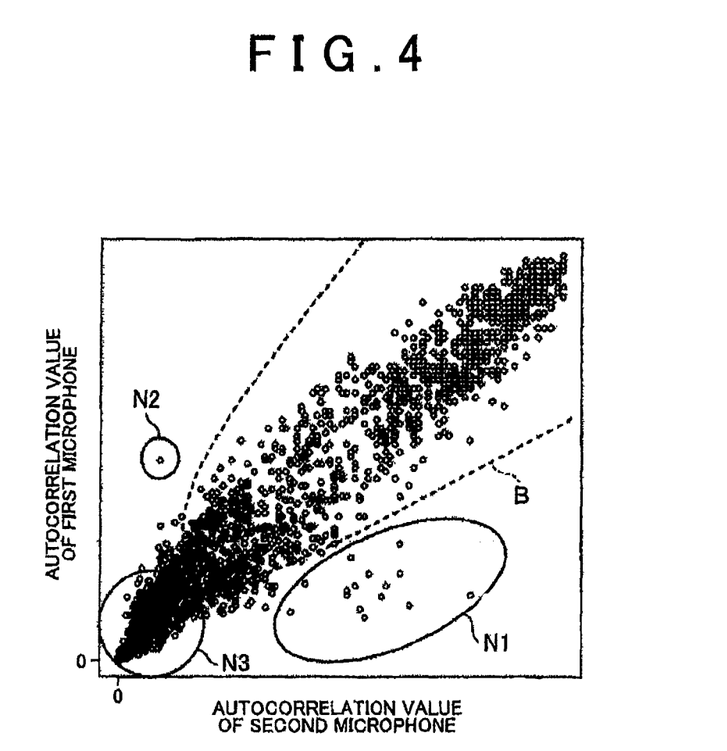
FIG. 4 is a view showing an example of a method of determining the existence of an approaching vehicle on a scatter diagram of autocorrelation values of audio signals from two microphones.

Referring to FIGS. 1 to 4, an approaching vehicle detection apparatus 1 according to the first embodiment will be described. FIG. 1 is a view showing a configuration of the approaching vehicle detection apparatus according to the first embodiment. FIGS. 2 to 4 are views showing examples of methods of determining the existence of an approaching vehicle on a scatter diagram of autocorrelation values of audio signals from the two microphones.

The approaching vehicle detection apparatus 1 calculates an autocorrelation and a cross-correlation from sounds collected by the two microphones, and detects the existence of an approaching vehicle, a direction of the approaching vehicle, and so on using the autocorrelation and the cross-correlation. For this purpose, the approaching vehicle detection apparatus 1 includes a first microphone 11, a second microphone 12, and an ECU 21 (a first analog-to-digital (A/D) conversion unit 21a, a second A/D conversion unit 21b, a first autocorrelation calculation unit 21c, a second autocorrelation calculation unit 21d, a cross-correlation calculation unit 21e, and a vehicle detection unit 21f).

Note that in the first embodiment, the first microphone 11 and the second microphone 12 correspond to the two or more sound collectors described in the claims, the first autocorrelation calculation unit 21c and the second autocorrelation calculation unit 21d correspond to autocorrelation calculating means described in the claims, the cross-correlation calculation unit 21e corresponds to cross-correlation calculating means described in the claims, and the vehicle detection unit 21f corresponds to determining means and specifying means described in the claims.

The two microphones 11, 12 constitute a microphone array, and are disposed in left and right front end portions of a vehicle so as to be oriented in a predetermined direction (for example, the two microphones 11, 12 are disposed at an identical height in left-right symmetrical positions relative to a vehicle center, and oriented either frontward or frontward and outward). The arrangement and sound collecting direction of the microphones 11, 12 may be set as desired. The microphones 11, 12 are acoustoelectric converters that collect peripheral sounds from the exterior of the vehicle and convert the collected sounds into audio signals (electric signals). The respective microphones 11, 12 collect sounds and output audio signals to the ECU 21 at frame intervals (fixed time intervals).

The ECU 21 is an ECU constituted by a central processing unit (CPU), a read only memory (ROM), a random access memory (RAM), and so on, and performs overall control of the approaching vehicle detection apparatus 1. The first A/D conversion unit 21a, the second A/D conversion unit 21b, the first autocorrelation calculation unit 21c, the second autocorrelation calculation unit 21d, the cross-correlation calculation unit 21e, and the vehicle detection unit 21f are provided in the ECU 21. The audio signals output respectively from the two microphones 11, 12 are input into the ECU 21 at frame intervals (fixed time intervals), whereupon various types of processing are performed by the respective processing units 21a, 21b, 21c, 21d, 21e, 21f using the audio signals.

The first A/D conversion unit 21a converts the audio signal (an analog signal) from the first microphone 11 into a digital audio signal at frame intervals. The second A/D conversion unit 21b converts the audio signal (an analog signal) from the second microphone 12 into a digital audio signal at frame intervals. Following A/D conversion, predetermined frequency bands (a high frequency band and a low frequency band that are respectively higher and lower than a band that comfortably includes a frequency band of the travel sound of the vehicle) are removed from the audio signals. Note that following this pre-processing, the audio signals are accumulated in a predetermined area of the RAM of the ECU 21 for a predetermined time (a sufficient amount of time to be able to calculate the autocorrelation and the cross-correlation).

The first autocorrelation calculation unit 21c calculates, at frame intervals, an autocorrelation value of the audio signal (a digital signal) from the first microphone 11, converted by the first A/D conversion unit 21a, using time series data relating to the audio signal. Further, the second autocorrelation calculation unit 21d calculates, at frame intervals, an autocorrelation value of the audio signal (a digital signal) from the second microphone 12, converted by the second A/D conversion unit 21b, using time series data relating to the audio signal.

An autocorrelation value calculation method according to this embodiment will now be described. This calculation method uses a cross power spectrum phase (CSP) analysis coefficient (a cross-correlation value). To calculate the CSP coefficient, first, when the audio signals from the respective microphones corresponding to a frame number t are set as $x_i(t)$ and a fast Fourier transform (FFT) of $x_i(t)$ is set as $X_i(\omega)$, $X_i(\omega)$ is calculated from Equation (1). Here, the "i" written as a subscript is a microphone number, and therefore i=1, 2. Further, when average amplitude data for the two microphones are set as $A(\omega)$, $A(\omega)$ is calculated from Equation (2). Note that $A(\omega)=X_i(\omega)$. Furthermore, when the FFTs of the respective microphones are set as $X_1(\omega)$, $X_2(\omega)$, the average amplitude data of the respective microphones are set as $A_1(\omega)$, $A_2(\omega)$, the CSP coefficient is set as csp (d), and a calculator minimum error is set as eps, csp (d) is calculated from Equation (3) (Equation (4) or Equation (5)). The "•" written as a superscript in the respective equations indicates a complex conjugate, and inverse fast Fourier transform is indicated as IFFT.

[Math. 1]

$$X_i(\omega) = FFT x_i(t) \qquad (1)$$

$$A(\omega) = \frac{A_1(\omega) + A_2(\omega)}{2} = \frac{1}{2}[e^{-j\omega 0} e^{-j\omega 0}]\begin{bmatrix} A_1(\omega) \\ A_2(\omega) \end{bmatrix} \qquad (2)$$

where $A(\omega) = X_i(\omega)$ $$csp(d) = IFFT(X_1(\omega)X_2^*(\omega)) \qquad (3)$$

$$= \begin{cases} IFFT\left(\frac{X_1(\omega)X_2^*(\omega)}{A_1(\omega)A_2(w)}\right) & (A_1(\omega)A_2(\omega) > eps) \\ IFFT\left(\frac{X_1(\omega)X_2^*(\omega)}{eps}\right) & \text{otherwise} \end{cases} \qquad (4)$$

$$= \begin{cases} IFFT\left(\dfrac{X_1(\omega)X_2^*(\omega)}{|X_1(\omega)||X_2(\omega)|}\right) & (A_1(\omega)A_2(\omega) > eps) \\ IFFT\left(\dfrac{X_1(\omega)X_2^*(\omega)}{eps}\right) & \text{otherwise} \end{cases} \quad (5)$$

In Equation (3), the value of csp (d) when $(X_1(\omega)=X_2^*(\omega))$ corresponds to the autocorrelation value. In this case, csp (d) becomes 1, but in actuality, a noise model is envisaged and incorporated into Equation (3). When an estimated value of a S/N ratio (SNR) is set as SNR ($\omega$) and a noise value is set as N ($\omega$), SNR ($\omega$) is calculated from Equation (6). A mask that passes a frequency band in which SNR ($\omega$) is larger than a threshold and blocks a frequency band in which SNR ($\omega$) is equal to or smaller than the threshold is generated. When the mask is set as M ($\omega$) and the threshold is set as Threshold$_{SNR}$, M ($\omega$) forms a conditional expression shown in Equation (7). Here, when the mask M ($\omega$) is incorporated into Equation (3), Equation (8) is obtained. The value of csp (d), which is calculated based on Equation (8) rewritten as $(X_1(\omega)=X_2^*(\omega))$, corresponds to the autocorrelation value. Hence, the value serving as the autocorrelation value calculated in this embodiment corresponds to a proportion of the signal passing through the mask, and therefore represents reliability in each frame. When the autocorrelation values of the respective microphones are set as $R_{ii}$ (i=1, 2), time series data in which the times of the audio signals of the microphones are not shifted and time series data in which the times are shifted by a time lag are used to calculate, for each microphone, $X_i(\omega)$ from Equation (1), $A_i(\omega)$ from Equation (2), and $R_{ii}$ from Equation (9). Note that the time lag is set at approximately several one hundreds of milliseconds and several tens of milliseconds, for example.

[Math. 2]

$$SNR(\omega) = 20\log_{10}\left(\dfrac{A(\omega)}{N(\omega)}\right) \quad (6)$$

$$M(\omega) = \begin{cases} 1 & SNR(\omega) > Threshold_{SNR} \\ 0 & \text{othrwise} \end{cases} \quad (7)$$

$$csp(d) = IFFT(X_1(\omega)X_2^*(\omega)M(\omega)) \quad (8)$$

$$R_{ii} = IFFT(X_i(\omega)X_i(\omega)M(\omega)) \quad (9)$$

Incidentally, in the case of a sound (travel sound from a vehicle, for example) emitted from a specific sound source, a correlation can be obtained following a time shift, and therefore the autocorrelation increases. In the case of ambient noise, however, a correlation cannot be obtained following a time shift, and therefore the autocorrelation decreases. Hence, the robustness of an autocorrelation against the S/N ratio increases even when the sound from the sound source is comparatively small. In particular, the robustness of an autocorrelation against the S/N ratio is higher than that of a cross-correlation calculated from audio signals generated respectively by a plurality of microphones.

The cross-correlation calculation unit 21e uses the time series data of the audio signal (digital signal) from the first microphone 11, converted by the first A/D conversion unit 21a, and the time series data of the audio signal (digital signal) from the second microphone 12, converted by the second A/D conversion unit 21b, to calculate, at frame intervals, a cross-correlation value (the CSP coefficient) between the audio signal from the first microphone 11 and the audio signal from the second microphone 12 by time-shifting the two sets of the time series data in steps. Here, the CSP coefficient is calculated using Equation (3) (or Equation (8)).

The vehicle detection unit 21f determines, at frame intervals, whether or not the autocorrelation value of the first microphone 11, calculated by the first autocorrelation calculation unit 21c, and the autocorrelation value of the second microphone 12, calculated by the second autocorrelation calculation unit 21d, satisfy a predetermined condition, and when the predetermined condition is satisfied, determines that an approaching vehicle (travel sound emitted by the vehicle) exists. The first microphone 11 and the second microphone 12 are disposed in proximal positions (at most approximately a width of the vehicle), and can therefore normally collect identical sounds. Hence, the autocorrelations thereof increase similarly in relation to a sound emitted from a specific sound source.

As shown in FIGS. 2 to 4 (on which the autocorrelation values of the respective microphones 11, 12 obtained over a predetermined time are plotted, the abscissa showing the autocorrelation value of the second microphone 12 and the ordinate showing the autocorrelation value of the first microphone 11), therefore, a correlative relationship exists between the autocorrelation value of the first microphone 11 and the autocorrelation value of the second microphone 12 such that when sound (in particular, vehicle travel sound) is emitted from a specific sound source on the periphery of the host vehicle, the autocorrelation value of the first microphone 11 and the autocorrelation value of the second microphone 12 both increase. However, when a large sound enters only one microphone, only the autocorrelation value of that microphone increases, and when only ambient noise enters both microphones, the autocorrelation values of both microphones decrease. It can therefore be determined that the predetermined condition is satisfied when the autocorrelation values of the two microphones 11, 12 increase by a certain extent. Examples of the condition for determining the existence of an approaching vehicle will be described below with reference to FIGS. 2 to 4.

In the example shown in FIG. 2, a threshold $th_{11}$ and a threshold $th_{22}$ are provided in relation to an autocorrelation value $R_{11}$ of the first microphone 11 and an autocorrelation value $R_{22}$ of the second microphone 12, respectively. A determination condition shown in Equation (10) is then set, and when the determination condition of Equation (10) is satisfied, it is determined that an approaching vehicle exists. The threshold $th_{11}$ and the threshold $th_{22}$ are set in advance by experiment or the like, and may take identical or different values. For example, when the first microphone 11 and the second microphone 12 are disposed in left-right symmetrical positions so as to exhibit left-right symmetrical sound collecting directivity, the threshold $th_{11}$ and the threshold $th_{22}$ are set at identical values, and when the first microphone 11 and the second microphone 12 are not disposed in left-right symmetrical positions and therefore do not exhibit left-right symmetrical sound collecting directivity, the threshold $th_{11}$ and the threshold $th_{22}$ are set at different values.

[Math. 3]

$$R_{11} > th_{11} \text{ and } R_{22} > th_{22} \quad (10)$$

In the example shown in FIG. 3, a threshold $r_{12}$ relating to a ratio between the autocorrelation value $R_{11}$ of the first microphone 11 and the autocorrelation value $R_{22}$ of the second microphone 12 and a threshold $th_{12}$ relating to the smaller autocorrelation value are provided. Next, a determination condition shown in Equation (11) is set, the ratio is determined by dividing the autocorrelation value $R_{11}$ by the autocorrelation value $R_{22}$, and the smaller autocorrelation value of the autocorrelation value $R_{11}$ and the autocorrelation value $R_{22}$ is selected. When the determination condition of Equation (11) is satisfied, it is determined that an approaching vehicle exists. The threshold $r_{12}$ and the threshold $th_{12}$ are set in advance by experiment or the like.

[Math. 4]

$$\frac{R_{11}}{R_{22}} > R_{12} \text{ and } \min(R_{11}, R_{22}) > th_{12} \quad (11)$$

In the example shown in FIG. 4, a determination boundary B (an equation expressing a boundary line, for example) indicated by a broken line N is set, and when the relationship between the autocorrelation value $R_{11}$ and the autocorrelation value $R_{22}$ is inside the determination boundary B, it is determined that an approaching vehicle exists. Here, any determination method that excludes all of a case in which only the autocorrelation value of the second microphone increases due to noise or the like (a distribution indicated by a symbol N1), a case in which only the autocorrelation value of the first microphone 11 increases due to noise or the like (a distribution indicated by a symbol N2), and a case in which the autocorrelation value of the first microphone 11 and the autocorrelation value of the second microphone both decrease due to ambient noise (a distribution indicated by a symbol N3) may be employed. The existence of an approaching vehicle can be determined even from a small travel sound by widening a range of the determination boundary B leftward and downward. In so doing, the approaching vehicle can be detected at an earlier timing, and the existence of an approaching vehicle located further away can be determined. When the determination boundary B is lowered excessively, however, ambient noise may be detected erroneously.

Incidentally, in a case where the autocorrelation value of only one microphone is used, since the autocorrelation value of the microphone may increase due to noise or the like, as described above, it is necessary to ensure that the threshold is not set too low to prevent an erroneous detection at such times. When the autocorrelation values of two or more microphones are used, on the other hand, the correlative relationship between the autocorrelation values can be determined, and therefore the approaching vehicle detection timing can be advanced by lowering the determination condition.

When the existence of an approaching vehicle has been determined on the basis of the autocorrelation value of the first microphone 11 and the autocorrelation value of the second microphone 12, the vehicle detection unit 21f uses the cross-correlation value calculated by the cross-correlation calculation unit 21e to detect an approach direction, a relative distance, and so on of the approaching vehicle on the basis of an arrival time difference at which the cross-correlation takes a maximum value. A conventional method is applied to this detection operation using the cross-correlation value.

Note that in a case where the cross-correlation value is used, it may be determined that an approaching vehicle exists when the cross-correlation value is larger than a threshold. A cross-correlation has a lower robustness against the S/N ratio than an autocorrelation, and therefore the determination threshold of the cross-correlation must be set higher than the determination threshold used with the autocorrelation. When the threshold is increased in this manner, the existence of an approaching vehicle cannot be determined until the travel sound increases to a certain extent, and therefore the approaching vehicle detection timing is delayed.

The ECU 21 then generates approaching vehicle information on the basis of the detection result obtained by the vehicle detection unit 21f, and transmits the approaching vehicle information to the driving assistance apparatus. The approaching vehicle information is information indicating the existence of an approaching vehicle and, when an approaching vehicle exists, the approach direction thereof and the relative distance thereof to the host vehicle, for example.

Figure 5:
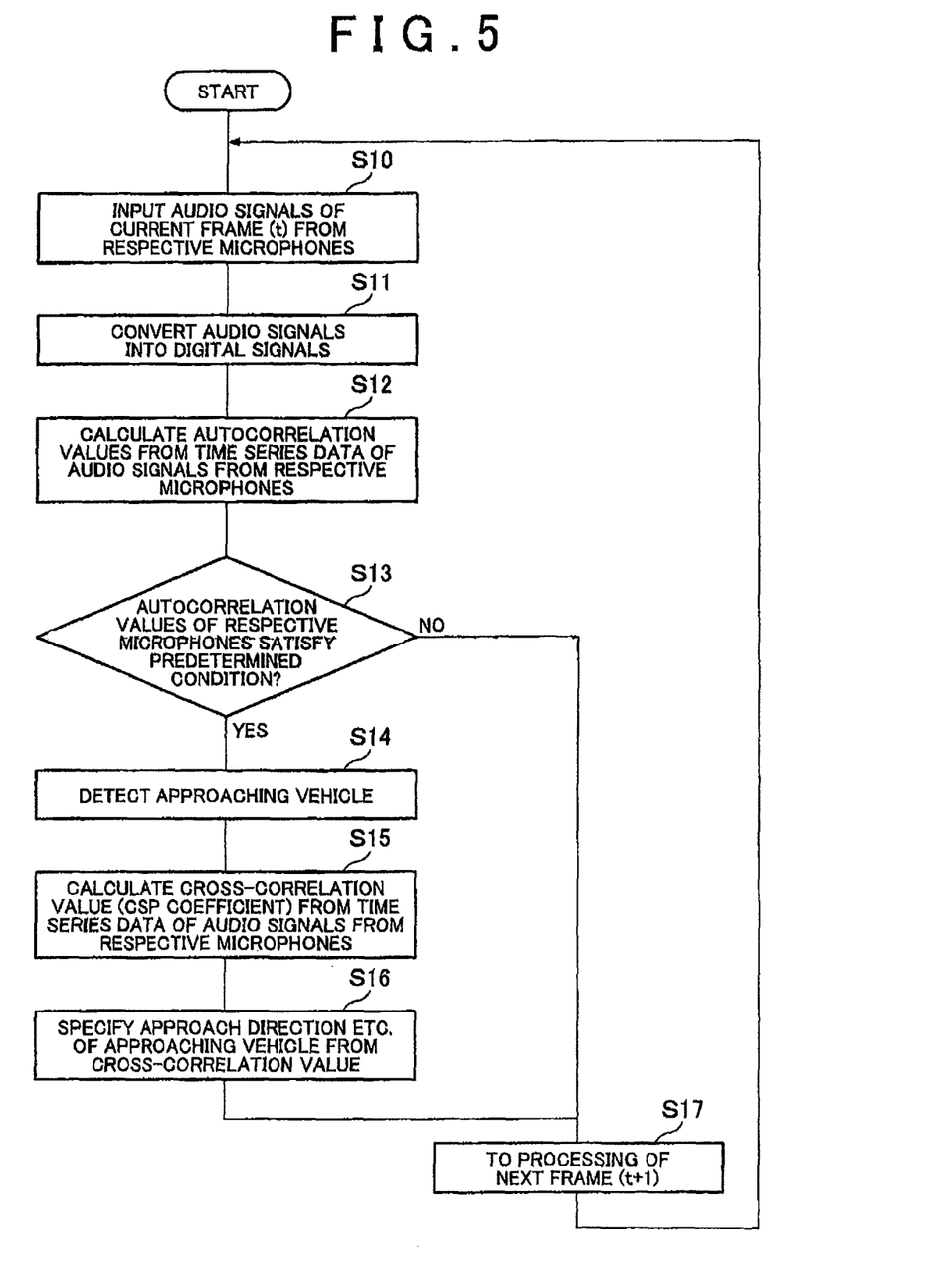
FIG. 5 is a flowchart showing a flow of approaching vehicle detection processing executed by an electronic control unit (ECU) according to the first embodiment.

Referring to FIGS. 1 to 4, an operation of an approaching vehicle detection function of the approaching vehicle detection apparatus 1 will be described. In particular, processing executed by the ECU 21 will be described using a flowchart shown in FIG. 5. FIG. 5 is a flowchart showing a flow of approaching vehicle detection processing executed by the ECU according to the first embodiment.

When the approaching vehicle detection apparatus 1 is operative, the microphones 11, 12 respectively collect peripheral sounds from the exterior of the vehicle at frame intervals, convert the collected sounds into audio signals (electric signals), and transmit the audio signals to the ECU 21. The respective audio signals of the current frame (t) are input into the ECU 21 from the microphones 11, 12 (S10).

The ECU 21 converts the respective audio signals into digital signals, and extracts a specific frequency band (a band including the frequency band of vehicle travel sound) from the digital audio signals (S11).

The ECU 21 then calculates an autocorrelation value using the time series data of the audio signal from the first microphone 11, and calculates an autocorrelation value using the time series data of the audio signal from the second microphone 12 (S12). The ECU 21 then determines whether or not the autocorrelation value of the first microphone 11 and the autocorrelation value of the second microphone 12 satisfy the predetermined condition (S13). When it is determined in S13 that the predetermined condition is not satisfied, the ECU 21 determines that an approaching vehicle does not exist. The ECU 21 then waits for a predetermined time, and then performs the processing in relation to a following frame (t+1) (S17).

When it is determined in S13 that the predetermined condition is satisfied, the ECU 21 determines that an approaching vehicle exists (S14). The ECU 21 then calculates a cross-correlation value (the CSP coefficient) using the time series data of the audio signal from the first microphone 11 and the time series data of the audio signal from the second microphone 12 (S15). The ECU 21 then specifies the approach direction and so on of the approaching vehicle on the basis of the cross-correlation value (S16). The ECU 21 then waits for a predetermined time, and then performs the processing in relation to the next frame (t+1) (S17).

The ECU 21 then generates the approaching vehicle information on the basis of the determination result obtained in S13 and the detection result obtained in S16, and transmits the approaching vehicle information to the driving assistance apparatus.

In the approaching vehicle detection apparatus 1, the autocorrelation values of the sounds collected by the microphones 11, 12 are calculated and used to determine the travel sound of an approaching vehicle. Therefore, high robustness against the S/N ratio is exhibited, leading to an improved approaching vehicle detection performance. In particular, in a case where the approaching vehicle approaches gradually such that the travel sound gradually increases in volume, a smaller travel sound can be determined than with a conventional method using a cross-correlation, and as a result, the approaching vehicle detection timing can be advanced.

According to the approaching vehicle detection apparatus 1 in particular, the two (plurality of) microphones 11, 12 are provided such that the autocorrelation values of the respective microphones 11, 12 are used, and therefore the robustness against the S/N ratio is particularly high, leading to a further improvement in the detection performance exhibited when detecting the travel sound of an approaching vehicle. For example, when the autocorrelation value of one microphone increases but the autocorrelation value of the other microphone remains low, noise can be determined, and therefore an improvement in detection precision can be obtained in comparison with a case where the autocorrelation value of a single microphone is used. Further, the determination is made on the basis of the correlative relationship between the autocorrelation values of the two microphones 11, 12, and therefore the determination condition (the threshold) for determining travel sound can be lowered in comparison with a case where the autocorrelation value of a single microphone is used. As a result, the travel sound can be determined at an earlier timing.

Furthermore, according to the approaching vehicle detection apparatus 1, the cross-correlation value between the sounds collected respectively by the two microphones 11, 12 is also calculated and used, and therefore the approach direction and the relative distance of the approaching vehicle can also be detected. Moreover, according to the approaching vehicle detection apparatus 1, by employing both an autocorrelation value and a cross-correlation value, a situation in which an erroneous detection is obtained from the cross-correlation value on the basis of the determination result obtained from the autocorrelation values can be prevented. As a result, the reliability of the detection result obtained from the cross-correlation value is improved.

Figure 6:
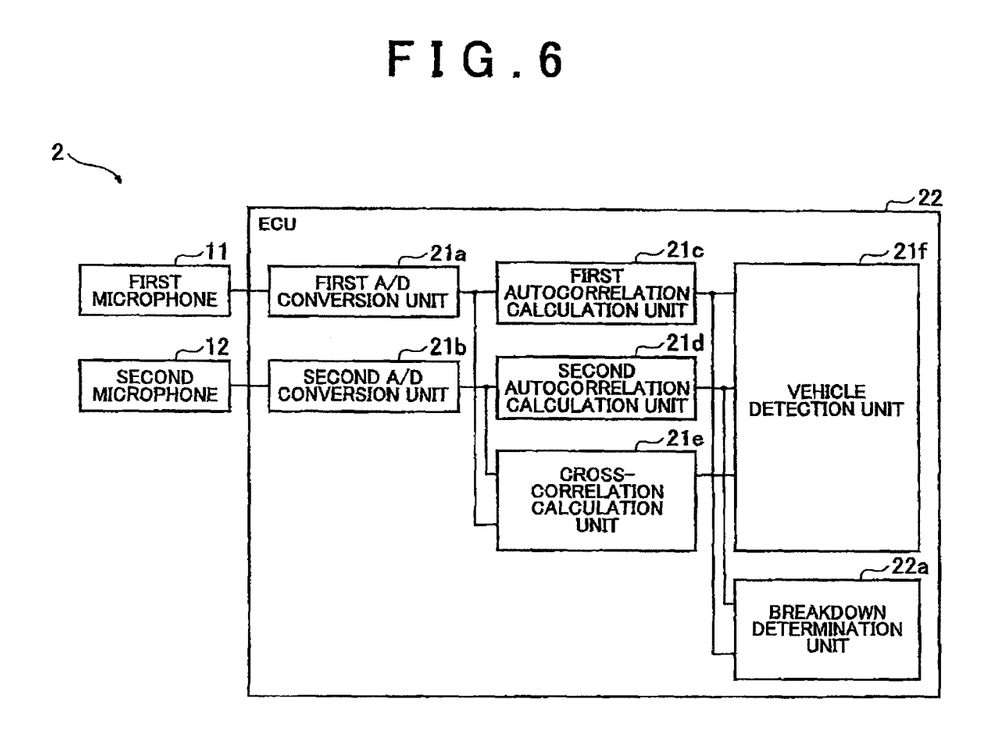
FIG. 6 is a view showing a configuration of an approaching vehicle detection apparatus according to a second embodiment.
Figure 7:
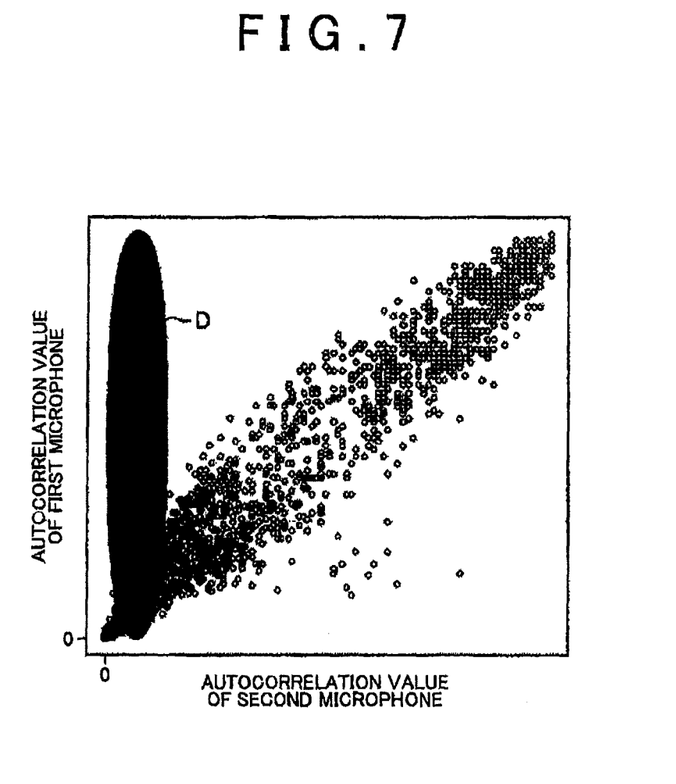
FIG. 7 is a view showing an example of a scatter diagram of autocorrelation values of audio signals from two microphones when a second microphone breaks down.

Referring to FIGS. 6 and 7, an approaching vehicle detection apparatus 2 according to a second embodiment will be described. FIG. 6 is a view showing a configuration of the approaching vehicle detection apparatus according to the second embodiment. FIG. 7 is a view showing an example of a scatter diagram of autocorrelation values of audio signals from two microphones when a second microphone breaks down.

The approaching vehicle detection apparatus 2 differs from the approaching vehicle detection apparatus 1 according to the first embodiment only in having a microphone breakdown determination function. The approaching vehicle detection apparatus 2 determines a microphone breakdown using the autocorrelations of the two microphones. Accordingly, in the second embodiment, only the microphone breakdown determination function will be described. The approaching vehicle detection apparatus 2 includes the first microphone 11, the second microphone 12, and an ECU 22 (the first A/D conversion unit 21a, the second A/D conversion unit 21b, the first autocorrelation calculation unit 21c, the second autocorrelation calculation unit 21d, the cross-correlation calculation unit 21e, the vehicle detection unit 21f, and a breakdown determination unit 22a). In the second embodiment, the breakdown determination unit 22a corresponds to breakdown determining means described in the claims.

The ECU 22 is an ECU constituted by a CPU, a ROM, a RAM, and so on, and performs overall control of the approaching vehicle detection apparatus 2. The first A/D conversion unit 21a, the second A/D conversion unit 21b, the first autocorrelation calculation unit 21c, the second autocorrelation calculation unit 21d, the cross-correlation calculation unit 21e, the vehicle detection unit 21f, and the breakdown determination unit 22a are provided in the ECU 22. Here, only the breakdown determination unit 22a will be described.

Typically, when a microphone breaks down (becomes disconnected, for example), the microphone can only output sounds of an identical level, and therefore the autocorrelation value thereof takes an irregular value (an extremely small value or an extremely large value, for example). FIG. 7 shows a case in which the second microphone 12 breaks down, with the result that the autocorrelation value of the second microphone 12 takes an extremely small value and exhibits substantially no variation (an elliptical distribution indicated by a reference symbol D) regardless of variation in the autocorrelation value of the first microphone. Note that FIG. 7 also shows a distribution obtained when the second microphone 12 is normal, similarly to FIGS. 2 to 4. Further, when a microphone breaks down, sounds may be output randomly such that the autocorrelation value takes a random value. In this case, when the autocorrelation values of the two microphones are distributed, the values are distributed over an entire region. When variation in the autocorrelation value of the normal microphone and variation in the autocorrelation value of the broken microphone are compared in such a case, there is no correlative relationship (a relationship in which an increase in one leads to an increase in the other) between the two autocorrelation values, and the two autocorrelation values vary in clearly different ways.

The breakdown determination unit 22a compares variation over a predetermined time in the autocorrelation value of the first microphone 11, calculated by the first autocorrelation calculation unit 21c, with variation over the predetermined time in the autocorrelation value of the second microphone 12, calculated by the second autocorrelation calculation unit 21d. When the autocorrelation value of one microphone varies but the autocorrelation value of the other microphone exhibits substantially no variation, the breakdown determination unit 22a determines that the other microphone has broken down, and therefore halts use of the other microphone such that the approaching vehicle detection apparatus 2 continues to operate using the one microphones alone. In this case, detection is performed using only one microphone, and therefore only the autocorrelation value can be determined and used to determine the existence of an approaching vehicle. Further, when the variation in the autocorrelation value of one microphone and the variation in the autocorrelation value of the other microphone are uncorrelated (i.e. distributed over the entire region as described above), the breakdown determination unit 22a determines that one of the two microphones has broken down, and therefore halts the operation of the approaching vehicle detection apparatus 2.

Figure 8:
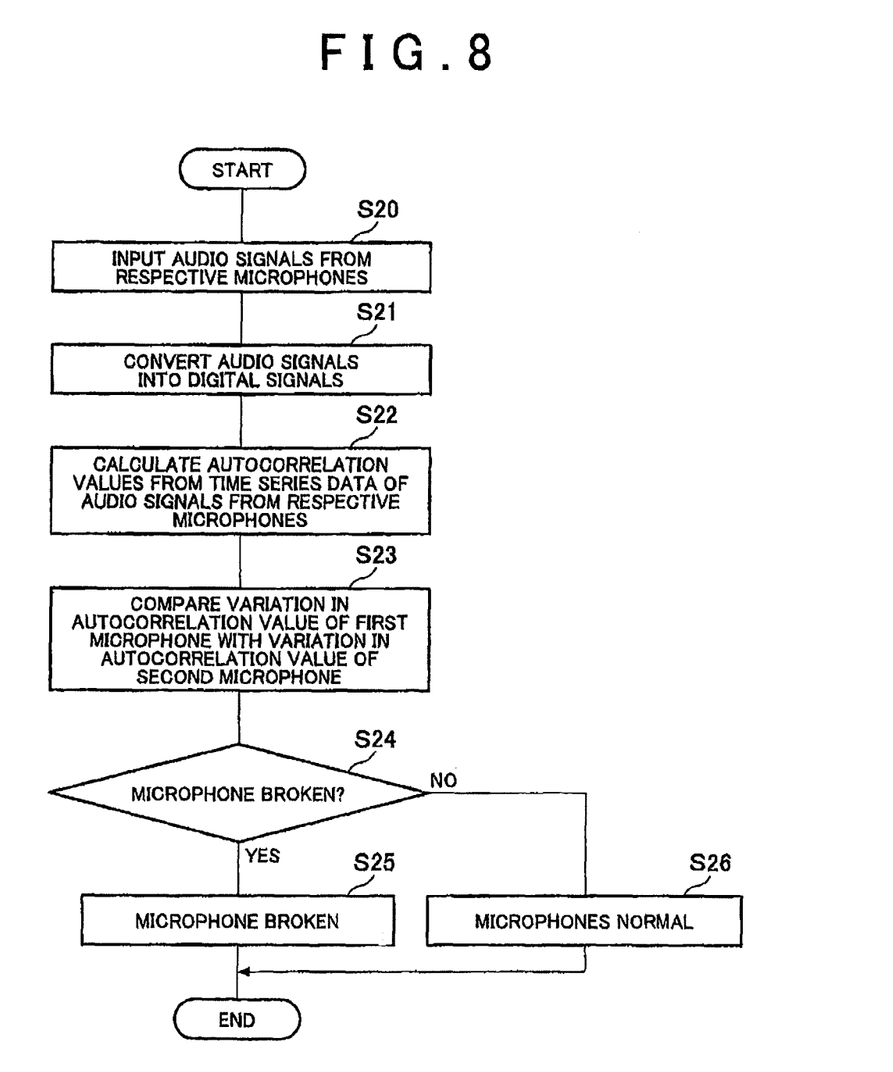
FIG. 8 is a flowchart showing a flow of microphone breakdown determination processing executed by an ECU according to the second embodiment.

Referring to FIGS. 6 and 7, an operation of the breakdown determination function of the approaching vehicle detection apparatus 2 will be described. In particular, processing executed by the ECU 22 will be described using a flowchart shown in FIG. 8. FIG. 8 is a flowchart showing a flow of microphone breakdown determination processing executed by the ECU according to the second embodiment. Note that the breakdown determination function operates only when the vehicle is started, and the determination is performed thereby using the audio signals output by the respective microphones 11, 12 over a predetermined time (a long enough time to obtain a sufficient number of audio signals (autocorrelation values) to be able determine a microphone breakdown) while the vehicle is started.

When the vehicle is started such that the approaching vehicle detection apparatus 2 operates, the microphones 11, 12 respectively collect peripheral sounds from the exterior of the vehicle, convert the collected sounds into audio signals (electric signals), and transmit the audio signals to the ECU 22. The respective audio signals are input into the ECU 22 from the microphones 11, 12 (S20). The ECU 22 converts the respective audio signals into digital signals, and extracts a specific frequency band from the digital audio signals (S21).

The ECU 22 then calculates an autocorrelation value using the time series data of the audio signal from the first microphone 11, and calculates an autocorrelation value using the time series data of the audio signal from the second microphone 12 (S22).

The ECU 22 then determines whether or not a microphone breakdown has occurred (S24) by comparing variation in the autocorrelation value of the first microphone 11 with variation in the autocorrelation value of the second microphone 12 (S23). When it is determined in S24 that a microphone breakdown has occurred (S25), the ECU 22 halts the operation of the approaching vehicle detection apparatus 2 in a case where the broken microphone cannot be specified, and halts use of the broken microphone in a case where the broken microphone can be specified such that the approaching vehicle detection apparatus 2 continues to operate using only the unbroken microphone. When the ECU 22 determines in S24 that the microphones are normal (S26), the operation of the approaching vehicle detection apparatus 2 is continued.

The approaching vehicle detection apparatus 2 exhibits following effects in addition to similar effect to the approaching vehicle detection apparatus 1 according to the first embodiment. According to the approaching vehicle detection apparatus 2, a microphone breakdown can be determined using the autocorrelation values of the two microphones 11, 12. As a result, an erroneous detection caused by a microphone breakdown can be prevented.

Figure 9:
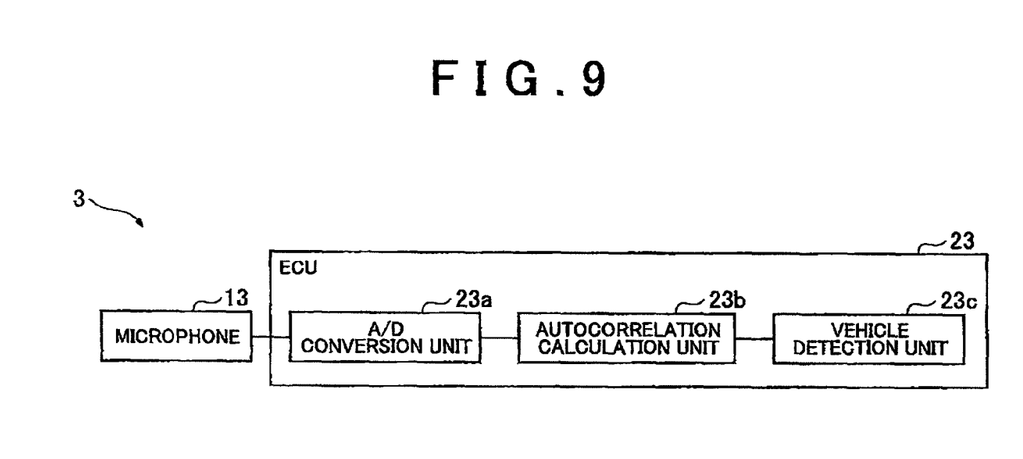
FIG. 9 is a view showing a configuration of an approaching vehicle detection apparatus according to a third embodiment.
Figure 10:
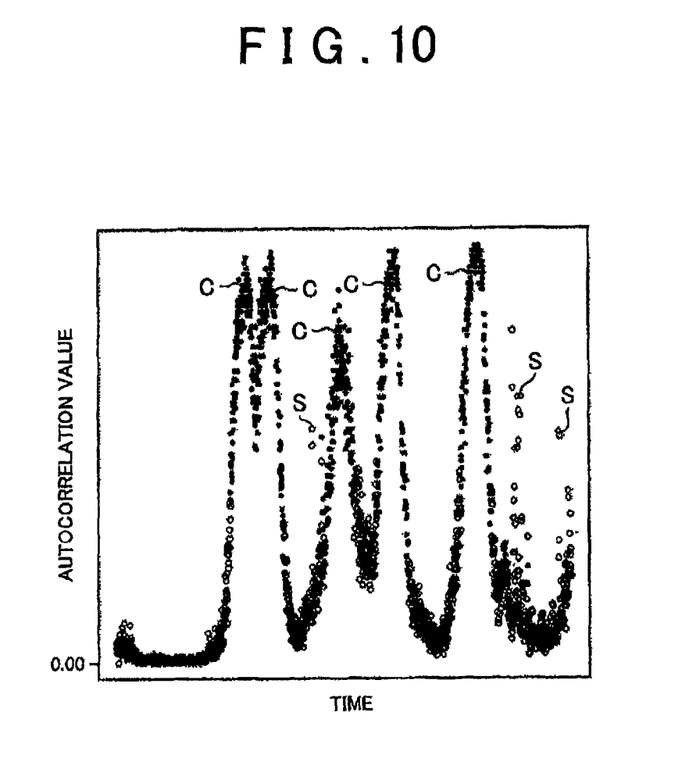
FIG. 10 shows an example of temporal variation in an autocorrelation value of an audio signal from a single microphone.

Referring to FIGS. 9 and 10, an approaching vehicle detection apparatus 3 according to a third embodiment will be described. FIG. 9 is a view showing a configuration of the approaching vehicle detection apparatus according to the third embodiment. FIG. 10 is a view showing an example of temporal variation in the autocorrelation value of the audio signal of a single microphone.

The approaching vehicle detection apparatus 3 calculates an autocorrelation from sounds collected by a single microphone, and uses the autocorrelation to determine the existence of an approaching vehicle. The approaching vehicle detection apparatus 3 includes a microphone 13, and an ECU 23 (an A/D conversion unit 23a, an autocorrelation calculation unit 23b, and a vehicle detection unit 23c).

Note that in the third embodiment, the microphone 13 corresponds to the at least one sound collector described in the claims, the autocorrelation calculation unit 23b corresponds to the autocorrelation calculating means described in the claims, and the vehicle detection unit 23c corresponds to the determining means described in the claims.

The microphone 13 is disposed in the front end portion of the vehicle (in a vehicle center position, for example). The microphone 13 collects sounds at frame intervals, and outputs audio signals to the ECU 23.

The ECU 23 is an ECU constituted by a CPU, a ROM, a RAM, and so on, and performs overall control of the approaching vehicle detection apparatus 3. The A/D conversion unit 23a, the autocorrelation calculation unit 23b, and the vehicle detection unit 23c are provided in the ECU 23. Audio signals are input into the ECU 23 from the single microphone 13 at frame intervals, whereupon various types of processing are performed by the respective processing units 23a, 23b, 23c using the audio signals.

The A/D conversion unit 23a performs similar processing to the A/D conversion units 21a, 21b according to the first embodiment on the audio signal (an analog signal) from the microphone 13 at frame intervals. The autocorrelation calculation unit 23b performs similar processing to the autocorrelation calculation units 21c, 21d according to the first embodiment on the audio signal (a digital signal) from the microphone 13, converted by the A/D conversion unit 23a, at frame intervals.

The vehicle detection unit 23c determines whether or not the autocorrelation value of the microphone 13, calculated by the autocorrelation calculation unit 23b, is larger than a threshold, and when the autocorrelation value is larger than the threshold, determines that an approaching vehicle (travel sound emitted by the vehicle) exists. The threshold is set in advance by experiment.

FIG. 10 shows an example of temporal variation in the autocorrelation value, wherein time is shown on the abscissa and the autocorrelation value is shown on the ordinate. As shown in FIG. 10, when the microphone 13 collects only ambient noise, the autocorrelation value takes a low value, but when the microphone 13 starts to collect travel sound from an approaching vehicle, the autocorrelation value increases (projecting parts indicated by a reference symbol C) so as to become clearly larger than the autocorrelation values obtained from ambient noise. The autocorrelation value may also increase due to spike noise (parts indicated by a reference symbol S). The aforesaid threshold is set by experiment at a value at which an autocorrelation value obtained from travel sound can be differentiated from not only an autocorrelation value obtained from ambient noise, but also an autocorrelation value obtained from this spike noise. Incidentally, in a case where two (a plurality of) microphones are used, as in the first embodiment, the existence of an approaching vehicle is determined using the correlative relationship between the autocorrelation values of the two microphones, and therefore a highly precise determination can be made even when the determination condition (the threshold) is lowered such that the autocorrelation value of one microphone is increased by the spike noise.

Figure 11:
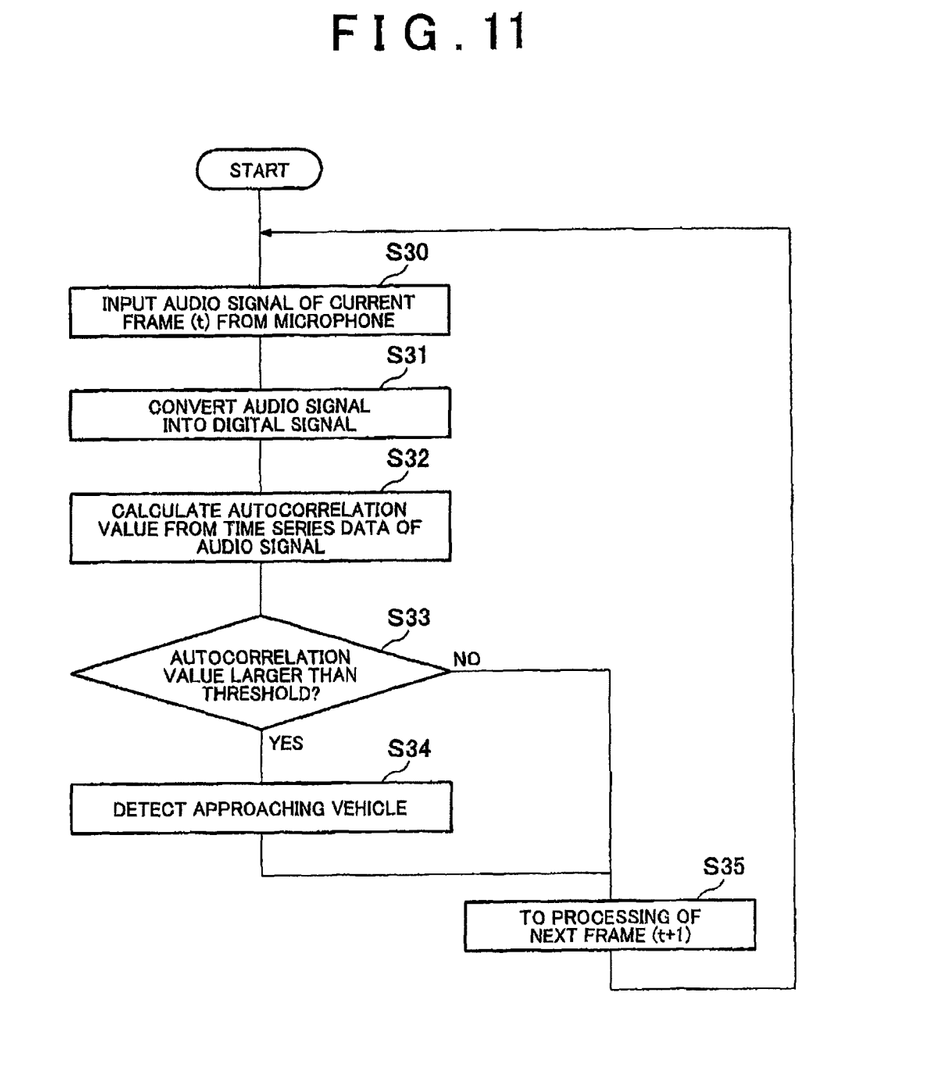
FIG. 11 is a flowchart showing a flow of approaching vehicle detection processing executed by an ECU according to the third embodiment.

Referring to FIGS. 9 and 10, an operation of the approaching vehicle detection function of the approaching vehicle detection apparatus 3 will be described. In particular, processing executed by the ECU 23 will be described using a flowchart shown in FIG. 11. FIG. 11 is a flowchart showing a flow of approaching vehicle detection processing executed by the ECU according to the third embodiment.

When the approaching vehicle detection apparatus 3 is operative, the microphone 13 collects peripheral sounds from the exterior of the vehicle at frame intervals, converts the collected sounds into audio signals (electric signals), and transmits the audio signals to the ECU 23. The audio signal of the current frame (t) is input into the ECU 23 from the microphone 13 (S30).

The ECU 23 converts the audio signal into a digital signal, and extracts a specific frequency band from the digital audio signal (S31).

The ECU 23 then calculates an autocorrelation value using time series data of the audio signal from the microphone 13 (S32). The ECU 23 then determines whether or not the autocorrelation value of the microphone 13 is larger than the threshold (S33). When it is determined in S33 that the autocorrelation value is smaller than the threshold, the ECU 23 determines that an approaching vehicle does not exist, and therefore waits for a predetermined time and then performs the processing in relation to the next frame (t+1) (S35). When it is determined in S33 that the autocorrelation value is larger than the threshold, the ECU 23 determines that an approaching vehicle exists (S34). The ECU 23 then waits for a predetermined time, and then performs the processing in relation to the next frame (t+1) (S35).

The ECU 21 then generates the approaching vehicle information on the basis of the determination result obtained in S33, and transmits the approaching vehicle information to the driving assistance apparatus.

According to the approaching vehicle detection apparatus 3, the existence of an approaching vehicle alone can be detected with an extremely simple system configuration using the single microphone 13. Further, according to the approaching vehicle detection apparatus 3, by calculating the autocorrelation value of the sound collected by the microphone 13 and using the autocorrelation value to determine travel sound from an approaching vehicle, high robustness against the S/N ratio is exhibited, leading to an improvement in the approaching vehicle detection performance.

Embodiments of the invention were described above, but the invention is not limited to the above embodiments, and may be implemented in various other embodiments.

For example, in the above embodiments, the sound source detection apparatus is applied to an approaching vehicle detection apparatus that detects an approaching vehicle (where travel sound from the vehicle serves as the sound source), but the sound source detection apparatus may be applied to an apparatus that detects a sound source other than a vehicle. Further, in the above embodiments, information relating to the detected approaching vehicle is provided to a driving assistance apparatus, but another configuration may be employed. For example, an approaching vehicle detection function may be incorporated into the driving assistance apparatus, or a warning function or the like may be provided in the approaching vehicle detection apparatus.

Furthermore, in the above embodiments, two microphones (sound collectors) are provided, and the autocorrelation and cross-correlation are calculated using the sounds collected respectively by the two microphones. However, three or more microphones may be provided such that the autocorrelation and cross-correlation are calculated using the sounds collected respectively by the three microphones. The detection precision increases steadily as the number of microphones increases.

Moreover, in the first embodiment, the autocorrelation value is calculated and used to determine the existence of an approaching vehicle, and when an approaching vehicle is determined to exist, the cross-correlation value is calculated and used to specify the approach direction and so on. Instead, however, the autocorrelation value and the cross-correlation value may be calculated in parallel such that the determination using the autocorrelation value and the determination using the cross-correlation value are performed in parallel, whereupon the existence and the approach direction of an approaching vehicle are specified on the basis of the two determination results.

Furthermore, in the second embodiment, the microphone breakdown determination is performed when the vehicle is started, but may be performed periodically as the vehicle travels.

INDUSTRIAL APPLICABILITY

According to the invention, in a sound source detection apparatus that detects a sound source of a detection subject on the basis of collected sounds, an autocorrelation of the collected sound is calculated and used to detect the sound source of the detection subject, and therefore high robustness against an S/N ratio is exhibited, leading to an improved detection performance when detecting the sound source of the detection subject.

1, 2, 3 approaching vehicle detection apparatus
11 first microphone
12 second microphone
13 microphone
21, 22, 23 ECU
21a first A/D conversion unit
21b second A/D conversion unit
21c first autocorrelation calculation unit
21d second autocorrelation calculation unit
21e cross-correlation calculation unit
21f, 23c vehicle detection unit
22a breakdown determination unit
23a A/D conversion unit
23b autocorrelation calculation unit

The invention claimed is:
1. A sound source detection apparatus comprising:
at least one sound collector;
a controller configured to calculate an autocorrelation between sounds collected in time series by the sound collector and to determine whether or not the sound source of the detection subject exists on the basis of the calculated autocorrelation wherein:
the sound source detection apparatus is installed in a vehicle;
the at least one sound collector includes a first sound collector and a second sound collector;
the controller is configured to calculate an autocorrelation value of the first sound collector and an autocorrelation value of the second sound collector;
the controller is configured to determine whether or not the autocorrelation value of the first sound collector is larger than a first threshold and the autocorrelation value of the second sound collector is larger than a second threshold, and to determine that another vehicle approaching the vehicle exists when the autocorrelation value of the first sound collector is larger than the first threshold and the autocorrelation value of the second sound collector is larger than the second threshold; and
the controller is configured to determine a breakdown in the first sound collector or the second sound collector by comparing variation in the autocorrelation value of the first sound collector with variation in the autocorrelation value of the second sound collector.

* * * * *